(12) United States Patent
Olczak

(10) Patent No.: US 7,072,092 B2
(45) Date of Patent: Jul. 4, 2006

(54) OPTICAL SUBSTRATE WITH MODULATED STRUCTURE

(75) Inventor: Eugene George Olczak, Glenville, NY (US)

(73) Assignee: General Electric Company, Schenectady, NY (US)

(*) Notice: Subject to any disclaimer, the term of this patent is extended or adjusted under 35 U.S.C. 154(b) by 119 days.

(21) Appl. No.: 10/747,959

(22) Filed: Dec. 31, 2003

(65) Prior Publication Data
US 2005/0141110 A1    Jun. 30, 2005

(51) Int. Cl.
*G02F 1/01* (2006.01)
(52) U.S. Cl. .................. 359/279; 359/245; 359/239
(58) Field of Classification Search ............... 359/279, 359/245, 239, 238, 626, 619, 625, 622, 637
See application file for complete search history.

(56) References Cited

U.S. PATENT DOCUMENTS

| 6,052,230 A | * | 4/2000 | Clark | ............ 359/626 |
| 2003/0214728 A1 | | 11/2003 | Olczak | ............ 359/707 |
| 2004/0120136 A1 | | 6/2004 | Olczak et al. | ............ 362/601 |

* cited by examiner

*Primary Examiner*—Timothy Thompson
(74) *Attorney, Agent, or Firm*—Foley & Lardner LLP

(57) ABSTRACT

There is provided an optical substrate. The optical substrate includes at least one surface. The at least one surface includes at least one optical structure having a shape and dimensions, wherein the shape and dimensions of each optical structure represents in part a modulation of a corresponding idealized structure. The shape and dimensions of each of the at least one optical structure are determined in part by at least one randomly generated component of modulation wherein the modulation of each of the at least one optical structure is limited by a neighboring optical structure comprised by the surface.

20 Claims, 15 Drawing Sheets

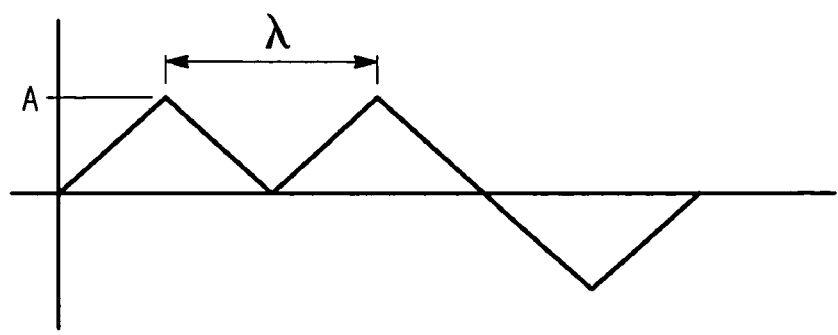
Fig. 14
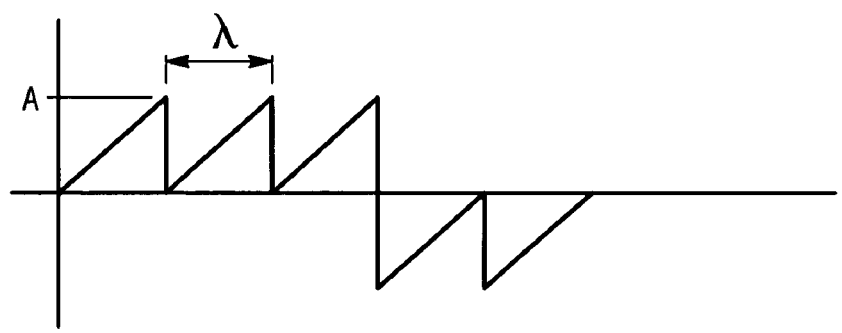
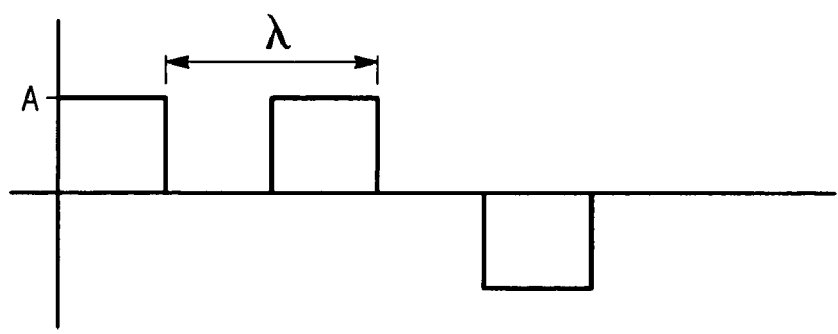

OPTICAL SUBSTRATE WITH MODULATED STRUCTURE

BACKGROUND OF THE INVENTION

The invention relates to an optical substrate with modulated structures on its surface. The optical substrate can be a light modulating substrate of a flat panel display backlight, such as a liquid crystal display (LCD) backlight.

A backlight illuminates a liquid crystal based display panel to provide a uniformly intense light distribution over the entire plane of the LCD display panel. A backlight system typically incorporates a light pipe to couple light energy from a light source to the LCD panel. An array of diffusing elements can be disposed along one surface of the light pipe to scatter incident light rays toward an output plane. The output plane couples the light rays into and through the LCD panel. The backlight can use a light modulating optical substrate with prismatic or textured structures to direct light along a viewing axis, usually normal to the display and to spread illumination over a viewer space. The backlight can use a plurality of optical substrates, stacked and arranged so that the prismatic or textured surfaces are perpendicular to one another and are sandwiched between optical modifying films known as diffusers. The brightness enhancement optical substrate and diffuser film combinations enhance the brightness of the light viewed by a user and reduce the display power required to produce a target illumination level.

It may be advantageous to modulate the structural order of an optical substrate to hide manufacturing defects and to decrease optical coupling interference such as Moiré interference. For example, copending patent application Ser. No. 10/248,099, filed Dec. 18, 2002 discloses modulating a prism structure of an optical substrate from a nominal linear path in a lateral direction (direction perpendicular to the height) by applying a nonrandom, random (or pseudo random) amplitude and period texture. The disclosure of application Ser. No. 10/248,099 is incorporated herein by reference in its entirety. Application Ser. No. 10/248,099 discloses a method which reduces interference Moiré effects. However, for a given nominal texture pitch, a peak to valley depth of the structures which have been modulated is approximately 100% greater than for the un-modulated structure of the same pitch. The greater peak to valley depth for the modulated structures may require a greater overall device thickness to preserve mechanical integrity. The nominal texture pitch is the center to center distance between adjacent structures, such as prisms, on the substrate, the peak to valley depth is the difference between peak and valley.

There is a need for an optical structure on light managed substrate with reduced interference and with preserved mechanical integrity.

SUMMARY OF THE INVENTION

According to one embodiment of the invention there is provided an optical substrate. The optical substrate comprises at least one surface, said at least one surface comprising at least one optical structure having a shape and dimensions, wherein the shape and dimensions of each optical structure represents in part a modulation of a corresponding idealized structure, and wherein said shape and dimensions of each of said at least one optical structure is determined in part by at least one randomly generated component of modulation wherein the modulation of each of said at least one optical structure is limited by a neighboring optical structure comprised by the surface.

According to one aspect of this embodiment, the at least one optical structure represents an idealized prismatic structure following a surface path modulated by a mathematical function (1)

$$y_i = A_i \sin\{\phi\lambda - \Phi_i\} + S_i \tag{1}$$

defined relative to a segment C of a coordinate system, wherein i is an integer indicative of the $i^{th}$ surface path, $y_i$ is an instantaneous displacement of the path relative to C on the $i^{th}$ path, $A_i$ is an amplitude scaling factor of the $i^{th}$ path relative to C, $S_i$ is a shift in a starting position of $y_i$, $\phi$ is a number between zero and $2\pi$ inclusive, $\lambda$ is a wavelength which is a real number, $\Phi_i$ is a phase component for the $i^{th}$ path, wherein $$\Phi_i = \Phi_{i-1} + Q_i\Delta + R_i\delta \tag{2}$$

where $Q_i$ is randomly or pseudo randomly chosen number having a value of 1 or −1 and $R_i$ is a continuous random variable between −1 and 1, each defined for the $i^{th}$ path, where $\Delta$ and $\delta$ are real numbers that define a magnitude of a phase stepping component and a magnitude of a phase dither component, respectively.

According to another aspect of this embodiment, the at least one optical structure represents an idealized prismatic structure following a surface path modulated by a mathematical function (3a)

$$y_i = \sum_{k=1}^{n} A_{i,k} \sin\{\phi\lambda_k - \Phi_{i,k}\} + S_i \tag{3a}$$

defined relative to a segment C of a coordinate system, wherein i is an integer indicative of the $i^{th}$ surface path, $y_i$ is an instantaneous displacement of the path relative to C on the $i^{th}$ path, $A_{i,k}$ is the $k^{th}$ amplitude scaling factor of the $i^{th}$ path relative to C, and $S_i$ is a shift in a starting position of $y_i$, $\phi$ is a number between zero and $2\pi$ inclusive, where n is an integer greater than 1, each wavelength $\lambda_k$ is a real number, $\Phi_{i,k}$ is the $k^{th}$ phase component of the $i^{th}$ path, wherein $$\Phi_{i,k} = \Phi_{i-1,k} + Q_{i,k}\Delta + R_{i,k}\delta \tag{3b}$$

$Q_{i,k}$ is the $k^{th}$ randomly or pseudo randomly chosen number having a value of 1 or −1 for the $i^{th}$ path, $R_{i,k}$ is the $k^{th}$ continuous random variable having a value between −1 and 1 for the $i^{th}$ path, and $\Delta$ and $\delta$ are real numbers that define a magnitude of a phase stepping component and a magnitude of a phase dither component, respectively.

According to another aspect of this embodiment, the at least one optical structure represents an idealized prismatic structure following a surface path modulated by a mathematical function (4a)

$$y_i = \sum_{k=1}^{n} A_{i,k} \sin\{\phi\lambda_k - \Phi_{i,k}\} + S_i \tag{4a}$$

wherein $f$ is a periodic function defined relative to a segment C of a coordinate system, wherein i is an integer indicative of the $i^{th}$ surface path, $y_i$ is an instantaneous displacement of the path relative to C on the $i^{th}$ path, $A_{i,k}$ is the $k^{th}$ amplitude scaling factor of the $i^{th}$ path relative to C, and $S_i$ is a shift in a starting position of $y_i$, $\phi$ is a number between zero and $2\pi$ inclusive, where n is an integer greater than 1, each wavelength $\lambda_k$ is a real number, $\Phi_{i,k}$ is the $k^{th}$ phase component of the $i^{th}$ path, wherein $$\Phi_{i,k} = \Phi_{i-1,k} + Q_{i,k}\Delta + R_{i,k}\delta \qquad (4b)$$

$Q_{i,k}$ is the $k^{th}$ randomly or pseudo randomly chosen number having a value of 1 or −1 for the $i^{th}$ path, $R_{i,k}$ is the $k^{th}$ continuous random variable having a value between −1 and 1 for the $i^{th}$ path, and $\Delta$ and $\delta$ are real numbers that define a magnitude of a phase stepping component and a magnitude of a phase dither component, respectively.

According to another aspect of this embodiment, the at least one optical structure represents an idealized prismatic structure following a surface path modulated by a mathematical function $$y_i = A_i[(1-m)r_i(\phi) + m \ r_{i-1}(\phi)] + S_i$$

wherein i and i−1 are indicative of an $i^{th}$ and a $(i-1)^{th}$ path, respectively, the $i^{th}$ and the $(i-1)^{th}$ paths being adjacent paths, the $i^{th}$ and the $(i-1)^{th}$ path amplitudes being mixed, wherein part of a random vector for $y_{i-1}$ is added to $y_i$ for the $i^{th}$ path, wherein $r_i(\phi)$ is a band-limited random or pseudo random function of $\phi$ for each $i^{th}$ path, $r_i(\phi)$ having a continuously varying value between −1 and 1; $\phi$ is $\phi$ to $2\pi$ inclusive; m is a scalar mixing parameter with a value between 0 and 1; $A_i$ is an amplitude scaling parameter; and $S_i$ is a shift in a starting position of $y_i$.

According to another embodiment of the invention there is provided a backlight display device. The backlight display device comprises: a light source for generating light; a light guide for guiding the light therealong including a reflective surface for reflecting the light out of the light guide; and an optical film. The optical film comprises: at least one surface, the at least one surface comprising at least one optical structure having a shape and dimensions, wherein the shape and dimensions of each optical structure represents in part a modulation of a corresponding idealized structure, and wherein said shape and dimensions of each of said at least one optical structure is determined in part by at least one randomly generated component of modulation wherein the modulation of each of said at least one optical structure is limited by a neighboring optical structure comprised by the surface.

BRIEF DESCRIPTION OF THE DRAWINGS

FIG. 14 is a graphical representation of mathematical functions;

DETAILED DESCRIPTION OF THE INVENTION

According to one aspect of the invention, a phase step limited modulation algorithm may be applied to modulate a regular function of the structure of an optical structure so as to provide an optical structure with a modulated structure. The resulting optical structure can comprise a randomly modulated optical structure defined by a modulation algorithm that modulates a parameter of the regular function, such as the phase, although the invention is not limited to modulating the phase. Preferably the modulation values are quantized and limited within intervals of adjacent paths of the optical structures.

Features of the invention will become apparent from the drawings and following detailed discussion, which by way of example without limitation describe preferred embodiments of the invention.

Figure 1:
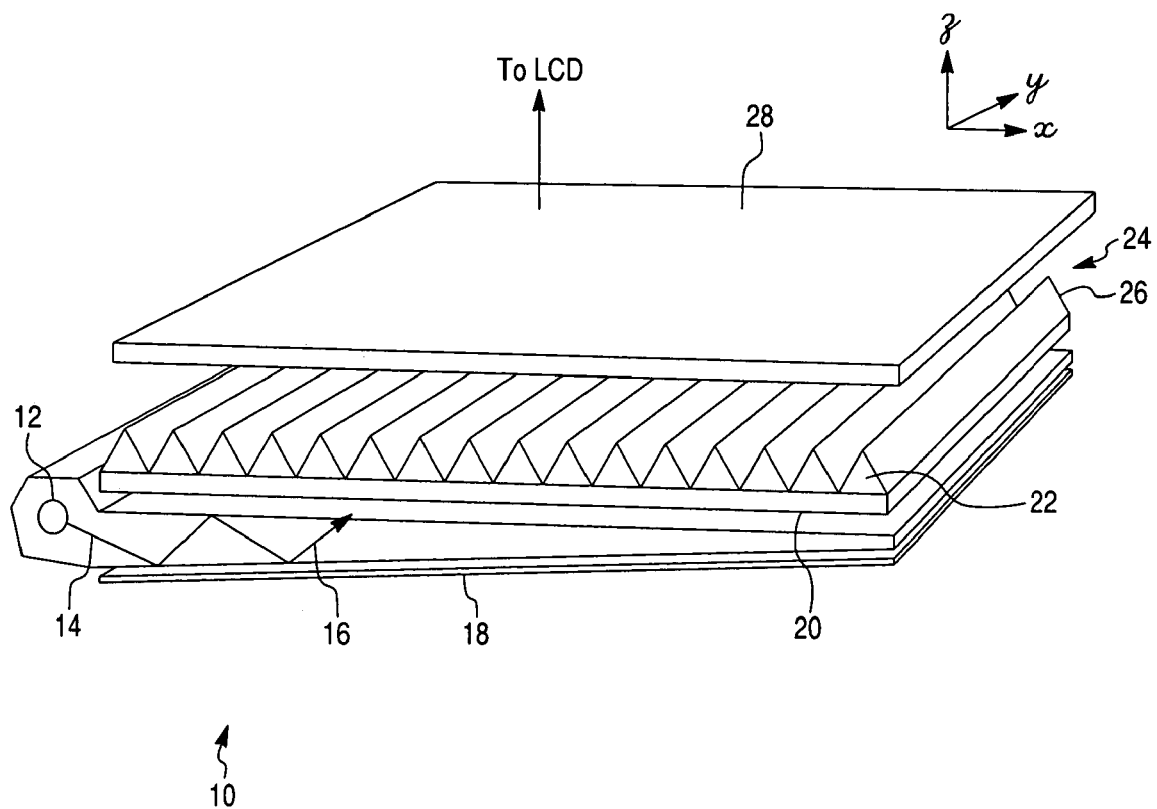
FIG. 1 is a three dimensional view of a backlight display device.

FIG. 1 is a perspective view of a backlight display device 10. The backlight display device 10 comprises an optical source 12 for generating light 16. A light guide 14 guides light 16 along its body from the optical source 12. The light guide 14 contains disruptive features that permit the light 16 to escape the light guide 14. Such disruptive features may include a surface manufactured from a master having a machined cutting gradient. A reflective substrate 18 positioned along the lower surface of the light guide 24 reflects light 16 escaping from a lower surface of the light guide 14 back through the light guide 16 and toward an optical substrate 24. The optical substrate 24 may be fabricated from a positive or negative master having a nonrandomized, randomized or pseudo randomized surface 22 prepared according to the invention.

At least one optical substrate 24 is receptive of the light 16 from the light guide 14. The optical substrate 24 comprises a planar surface 20 on one side and the randomized three dimensional surface 22 on the second opposing side. Optical substrate 24 receives light 16 and turns and diffuses the light 16 in a direction that is substantially normal to the optical substrate 24 as shown. A diffuser 28 is located above the optical substrate 24 to provide diffusion of the light 16. For example, the diffuser 28 can be a retarder film that rotates the plane of polarization of light exiting the optical substrate 24 to match the light to the input polarization axis of the LCD. The retarder film may be formed by stretching a textured or untextured polymer substrate along an axis in the plane of the substrate 24.

FIG. 1 shows a single substrate 24. However, a backlight display device may comprise a plurality of substrates 24 positioned, one above the other, in a crossed configuration with respective prismatic structures 26 positioned at angles to one another. Yet further, one or both sides of the substrates 24 may comprise prismatic structures 26. The optical substrate 24 may be formed by a process of electroforming from a work piece master that is fabricated as herein described below. The optical substrate 24, however, is not limited to any particular fabrication process.

Figure 2:
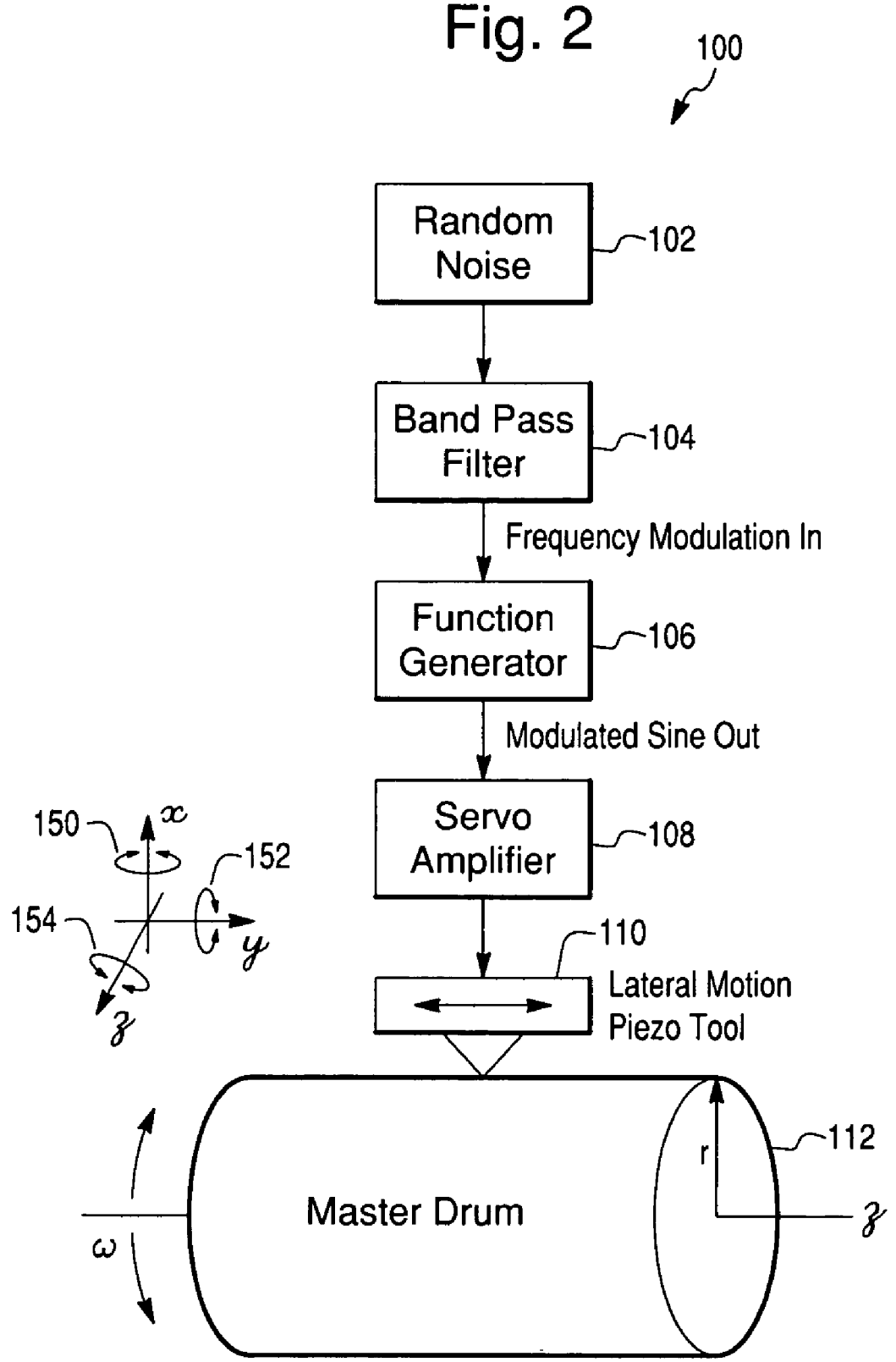
FIG. 2 is a flow chart showing a method of machining a surface of a workpiece wherein the workpiece is a master drum.
Figure 3:
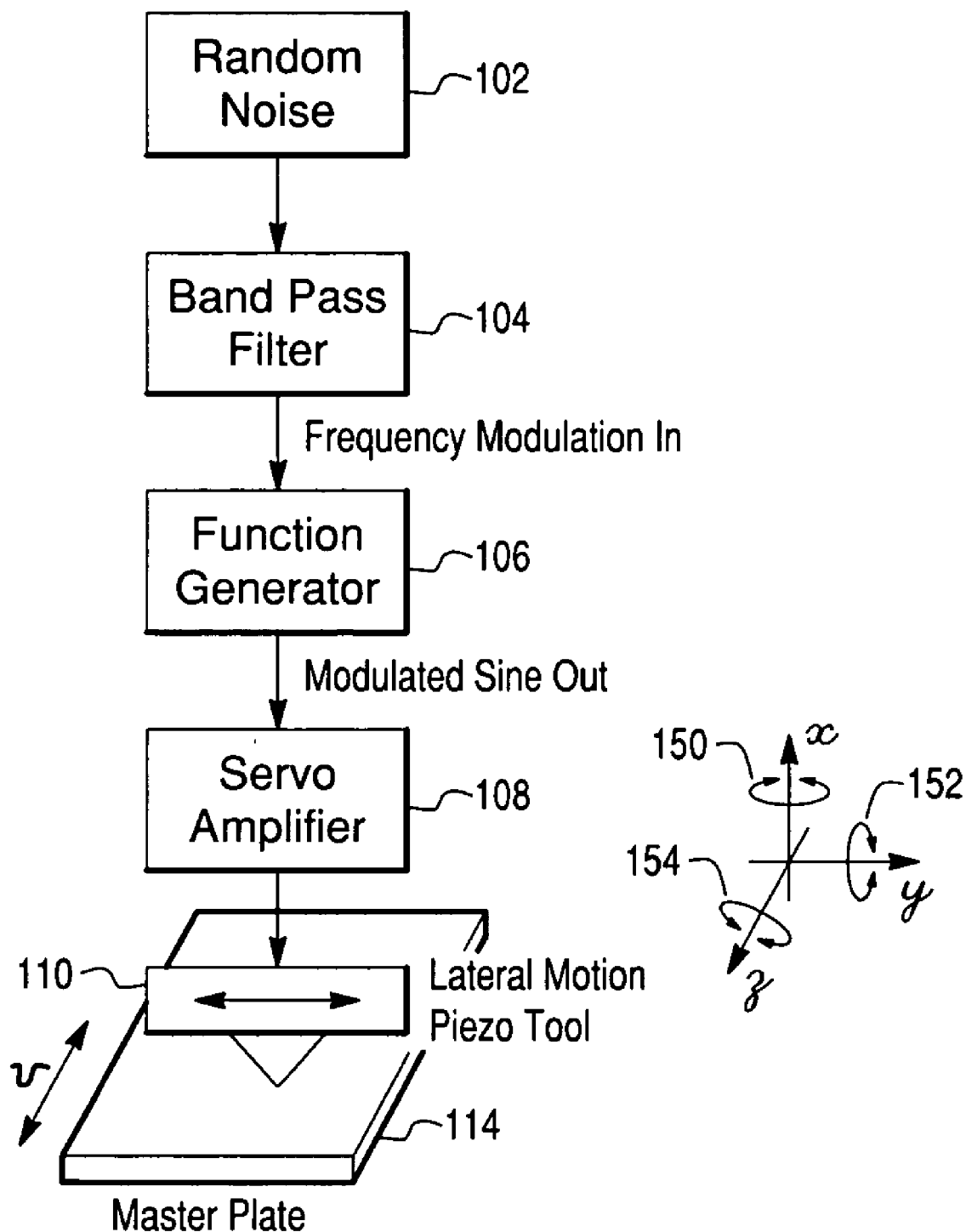
FIG. 3 is a flow chart showing a method of machining a surface of a workpiece wherein the workpiece is on a master plate.

FIG. 2 illustrates a method of machining a surface of a work piece such as a master shown generally at 100. The work piece can be a master to model an optical substrate 24 having a nonrandomized, randomized or pseudo randomized surface 22 according to the invention. In FIG. 2, a noise signal 102 is band pass filtered 104 and provided as input to a function generator 106. A modulating mathematical function, such as a sinusoidal wave form is provided by the function generator 106 as input to a servo mechanism 108. The noise signal 102, the bandpass filter 104 and the function generator 106 can be replaced by a computer system equipped with the appropriate signal processing software and digital-to-analog conversion board so as to generate the input signal to the servo mechanism 108.

Figure 4:
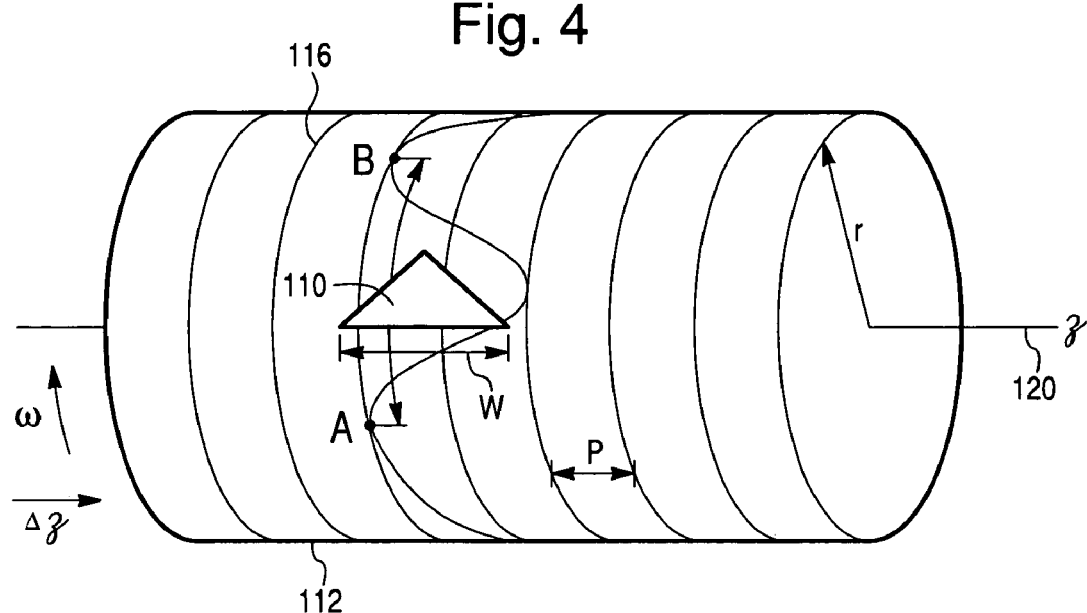
FIG. 4 is a diagram of a master drum having a random or pseudo random pattern therein following a generally spiral-like or threaded path.

The servo mechanism 108 directs relative movement between the cutting tool 110 and the surface of a drum 112 rotating at an angular velocity of ω in a cylindrical coordinate system (r,θ,z). As the drum 112 rotates at angular velocity ω the cutting tool 110 moves relative to the drum 112 along the drum axis, z, and may be driven back and forth with a frequency of up to about 10,000 Hz parallel to the z-axis of drum 112 (along the y-axis of the tool). The tool 110 may be driven back and forth parallel to the axis of the drum in a random or pseudo random nature in an embodiment of the invention. Cutting tool 110 is in continuous contact with the surface of rotating drum 110 to cut or machine a randomized spiral-like or threaded pattern 116 (FIG. 4) of nominal pitch, P. A two axis cutting tool 110 moves back and forth parallel to the drum axis 112 and also perpendicular to the drum surface.

Figure 6:
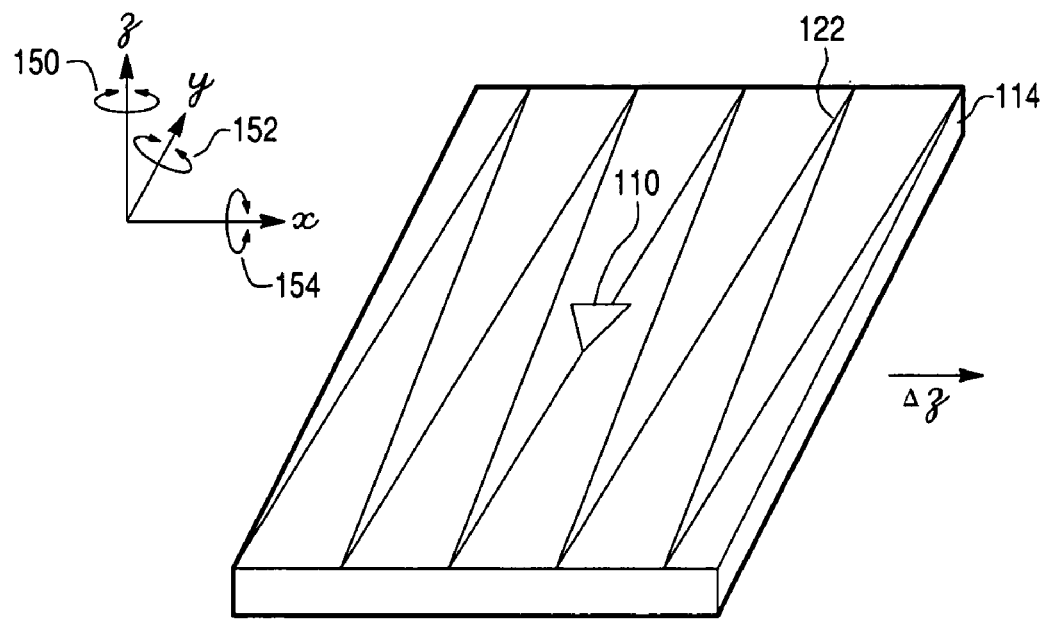
FIG. 6 is a diagram of a master plate having a random or pseudo random pattern therein following a generally sawtooth or triangular path.
Figure 7:
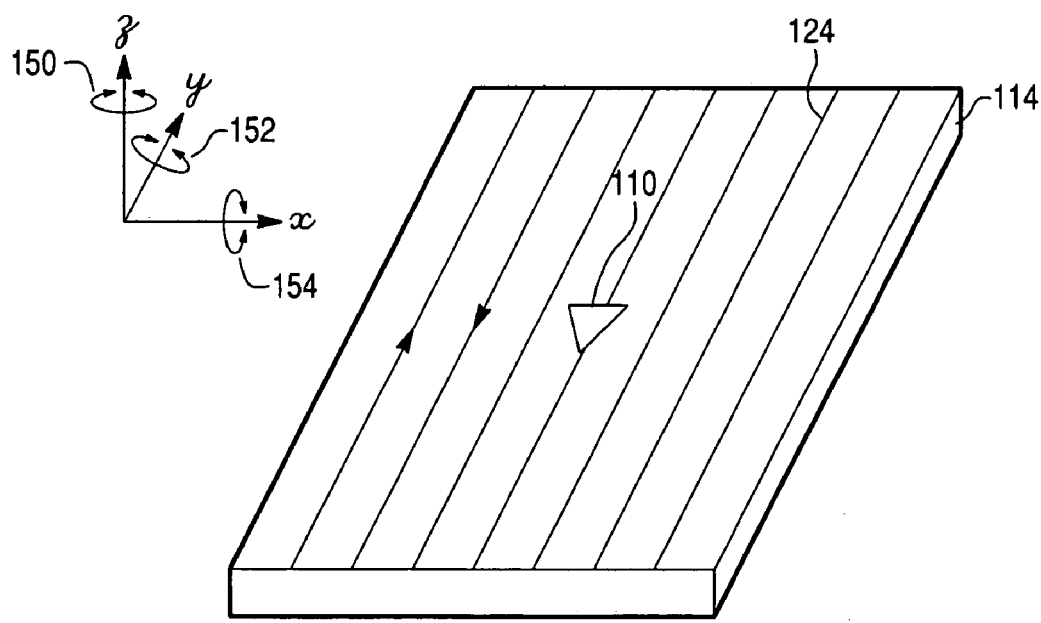
FIG. 7 is a diagram of a master plate having a random or pseudo random pattern therein along a series of paths.

Alternatively, the cutting tool 110 may be in contact with the surface of a flat plate 114 as seen in FIG. 6, moving at a velocity of v in a rectilinear coordinate system (x,y,z). As plate 114 moves at velocity θ, the cutting tool 110 is driven back and forth across the plate in a random or pseudo random nature to cut or machine a randomized triangular pattern 122 (FIG. 6), for example, into the surface of the plate 114.

Figure 5:
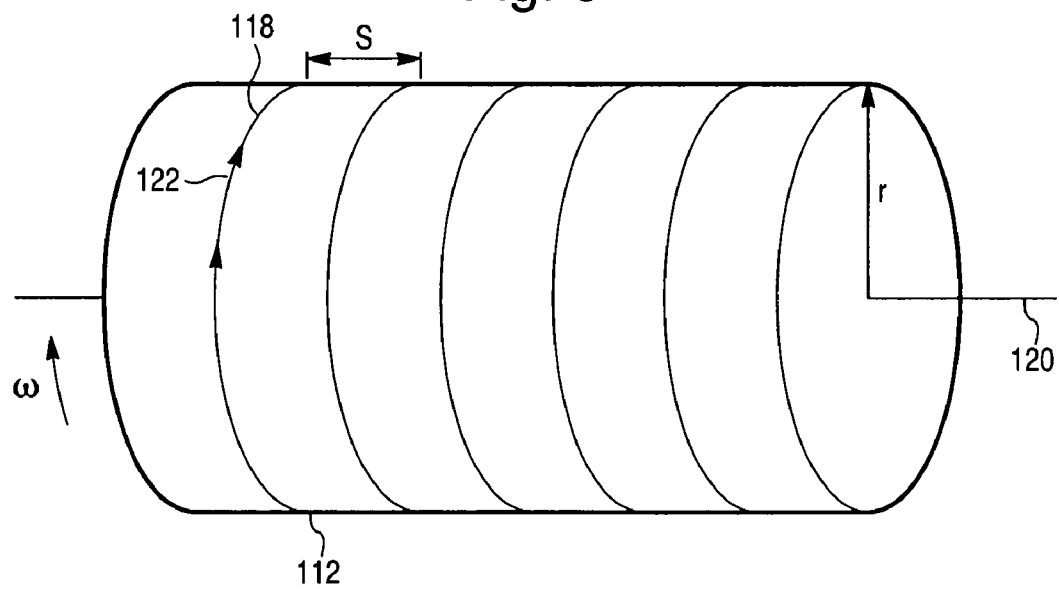
FIG. 5 is a diagram of a master drum having a random or pseudo random pattern therein over generally concentric paths.

In an alternative embodiment of the invention, as seen in FIG. 5, the drum 112 need not move along the z axis as the drum 112 rotates. As such, the cutting tool machines a randomized or pseudo randomized pattern along a series of concentric rings 118 in the surface of the drum 112 whereby the cutting tool returns to a starting point 122 for each cutting pass. To achieve good cutting quality, a control system can allow the cutting tool 110 to repeat the pattern of any $i^{th}$ cutting pass for the number of revolutions depending upon the desired final cut depth and in-feed rate. When the cutting tool 110 finishes the number of revolutions and returns to the starting point 122 of the $(i-1)^{th}$ cutting pass, the cutting tool 110 is shifted or stepped a distance $S_i$, to be positioned at position $S_i$ for the next, or $i^{th}$, cutting pass.

Figure 16:
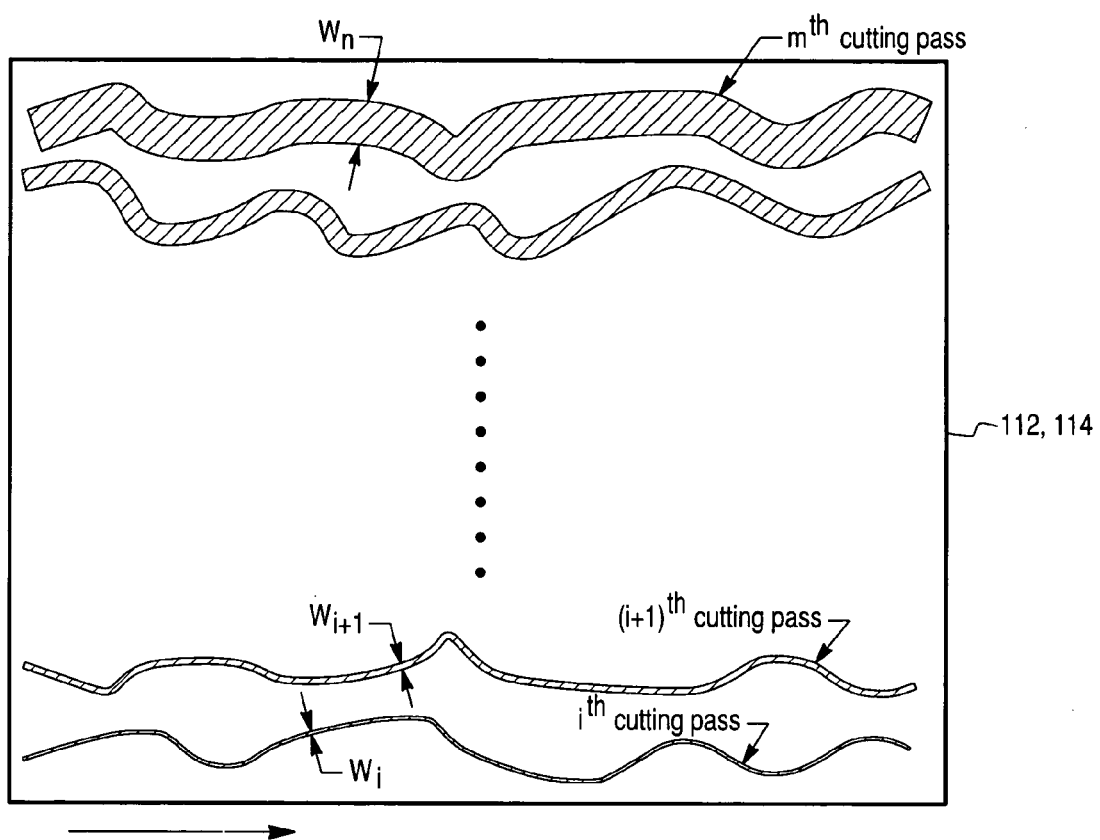
FIG. 16 is a depiction of a cutting gradient introduced into the surface of the machined surface of the workpiece

The cutting tool 110 may have more than one axis of travel. For example it can have three axes of travel r, θ, z in cylindrical coordinates and x, y, z in rectilinear coordinates. Such additional axes allow for the cutting of toroidal lens type structures when using a radiused cutting tool 110 or allow for a gradient in the cut along the cut length, for example. Translational axes r, θ, z and x, y, z will also allow for introducing a cutting gradient into the pattern machined into the surface of the workpiece 112, 114 for subsequent cutting passes. Such a cutting gradient is best seen with reference to FIG. 16. In FIG. 16, the $i^{th}$ cutting pass has a thickness or width of $w_i$ and the $(i+1)^{th}$ cutting pass has a thickness of $w_{i+1}$ where $w_i$ is greater or less than $w_{i+1}$. In general, the $n^{th}$ cutting pass has a width of $w_n$ where $w_n$ is greater or less than $w_i$, whre i≠n. It will be understood that the change in the thickness in the cutting pattern in subsequent cutting passes may be nonrandom, random or pseudo random. Additional rotational degrees of freedom (e.g., pitch 152, yaw 150 and roll 154, FIGS. 2–7) may be used to change the angular orientation of the cutting tool 110 with respect to the surface of the workpiece 112, 114, thus changing the geometry of the facets machined into the master surface.

The randomized or pseudo randomized pattern machined into the surface of the work piece 112, 114 is in the nature of a number of paths of idealized structure, the idealized structure, hourly paths defined by mathematical function defined over a segment, C, of a coordinate system and characterized by a set of random or pseudorandom phase or other parameters. For a rotating drum 112, the segment, C, over which the mathematical function is defined is the circumference of the drum 112. For a moving plate 114, the segment, C, over which the mathematical function is defined is a width or length of the plate 114. An exemplary mathematical function is a function that is periodic over the segment C, such as that of the sine wave of Equation 1:

$$y_i = A_i \sin\{\phi\lambda - \Phi_i\} + S_i \qquad (1)$$

defined relative to the segment C, i is an integer indicative of the $i^{th}$ surface path, $y_i$ is an instantaneous displacement of the path relative to C on the $i^{th}$ path, $A_i$ is an amplitude scaling factor of the $i^{th}$ path relative to C, and $S_i$ is a shift in a starting position of $y_i$. $\phi$ is a number between zero and $2\pi$ inclusive, and λ is a wavelength which is a real number. $\Phi_i$ is a phase component for the $i^{th}$ path, wherein $$\Phi_i = \Phi_{i-1} + Q_i \Delta + R_i \delta \qquad (2)$$

where $Q_i$ is randomly or pseudo randomly chosen number having a value of 1 or −1 and $R_i$ is a continuous random variable between −1 and 1, each defined for the $i^{th}$ path. Δ and δ are real numbers that define a magnitude of a phase stepping component and a magnitude of a phase dither component, respectively. The nominal y position $S_i$ is the y position without any modulation of the path.

By limiting the absolute value of $Q_i\Delta + R_i\delta$ to less than π radians the depth of the patterned surface is reduced since adjacent tool paths are not permitted to be π radians out of phase.

In the more general case where multiple wavelengths are used simultaneously at each path, the idealized prismatic structure following a surface path is modulated by a mathematical function (3a)

$$y_i = \sum_{k=1}^{n} A_{i,k} \sin\{\phi\lambda_k - \Phi_{i,k}\} + S_i \quad (3a)$$

defined relative to the segment C, wherein i is an integer indicative of the $i^{th}$ surface path, $y_i$ is an instantaneous displacement of the path relative to C on the $i^{th}$ path. $A_{i,k}$ is the $k^{th}$ amplitude scaling factor of the $i^{th}$ path relative to C, and $S_i$ is a shift in a starting position of $y_i$, $\phi$ is a number between zero and $2\pi$ inclusive, n is an integer greater than 1, and wavelength $\lambda_k$ is a real number. $\Phi_{i,k}$ is the $k^{th}$ phase component of the $i^{th}$ path, wherein $$\Phi_{i,k} = \Phi_{i-1,k} + Q_{i,k}\Delta + R_{i,k}\delta \quad (3b)$$

$Q_{i,k}$ is the $k^{th}$ randomly or pseudo randomly chosen number having a value of 1 or −1 for the $i^{th}$ path, $R_{i,k}$ is the $k^{th}$ continuous random variable having a value between −1 and 1 for the $i^{th}$ path, and $\Delta$ and $\delta$ are real numbers that define a magnitude of a phase stepping component and a magnitude of a phase dither component, respectively. The nominal y position $S_i$ is the y position without any modulation of the path.

An even more general case for the function $y_i$ is provided by:

$$y_i = \sum_{k=1}^{n} A_{i,k} f\{\phi\lambda_k - \Phi_{i,k}\} + S_i \quad (4a)$$

$$\Phi_{i,k} = \Phi_{i-1,k} + Q_{i,k}\Delta + R_{i,k}\delta \quad (4b)$$

where periodic function $f$ has been substituted for the sine function of equation (3a) in equation (4a). Such periodic functions include for example the well known triangular function, sawtooth function and square wave function.

It will be understood that the mathematical function $f$ referred to above may be any mathematical function $f$ that can be programmed into a computer numerically controlled (CNC) machine. Such functions include for example the well known triangular function, sawtooth function and square wave function (FIG. 14) each of which may be randomly modulated in phase.

In another embodiment the paths of the idealized structure can be limited by allowing mixing of the amplitude adjacent tool paths. Suppose that $y_i$ is given by $$y_i = A r_i(\phi) + S_i \quad (5)$$

where $r_i(\phi)$ is a band limited random or pseudo random function of $\phi$ for each ith path with a continuously varying value between −1 and 1, Ai is an amplitude constant, Si is the shift in starting position and the nominal y position for the ith path, and $\phi$ is in the range of 0 to $2\pi$. The mixing may be introduced by use of a mixing parameter, m, such that part of the random vector for the (i−1)th random function is added to yi for the ith path as given in equation 6.

$$y_i = A[(1-m)r_i(\phi) + m\, r_{i-1}(\phi)] + S_i \quad (6)$$

where m is a scalar mixing parameter with a value between 0 and 1.

Figure 8:
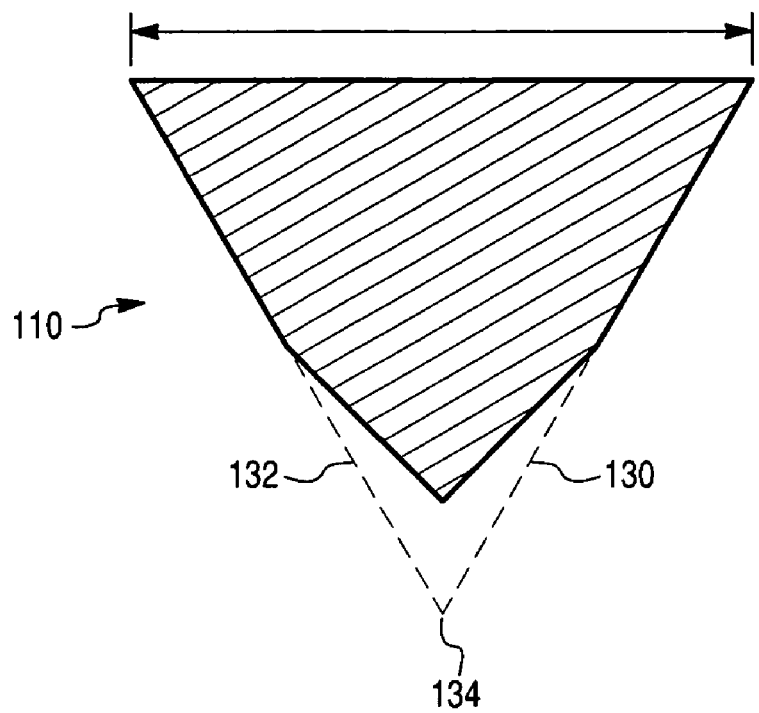
FIG. 8 is a diagram of a cross section of a cutting tool in the nature of a prismatic structure.
Figure 9:
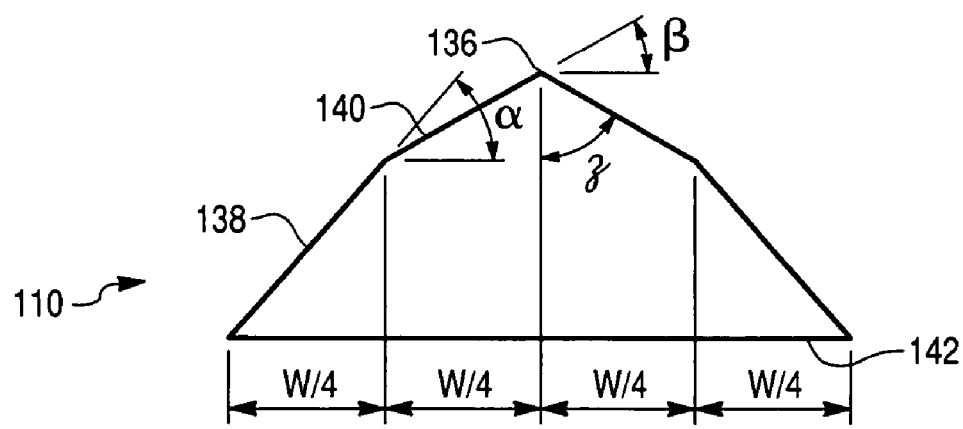
FIG. 9 is a diagram of the prismatic cutting tool of FIG. 8 having compound angled facets.
Figure 10:
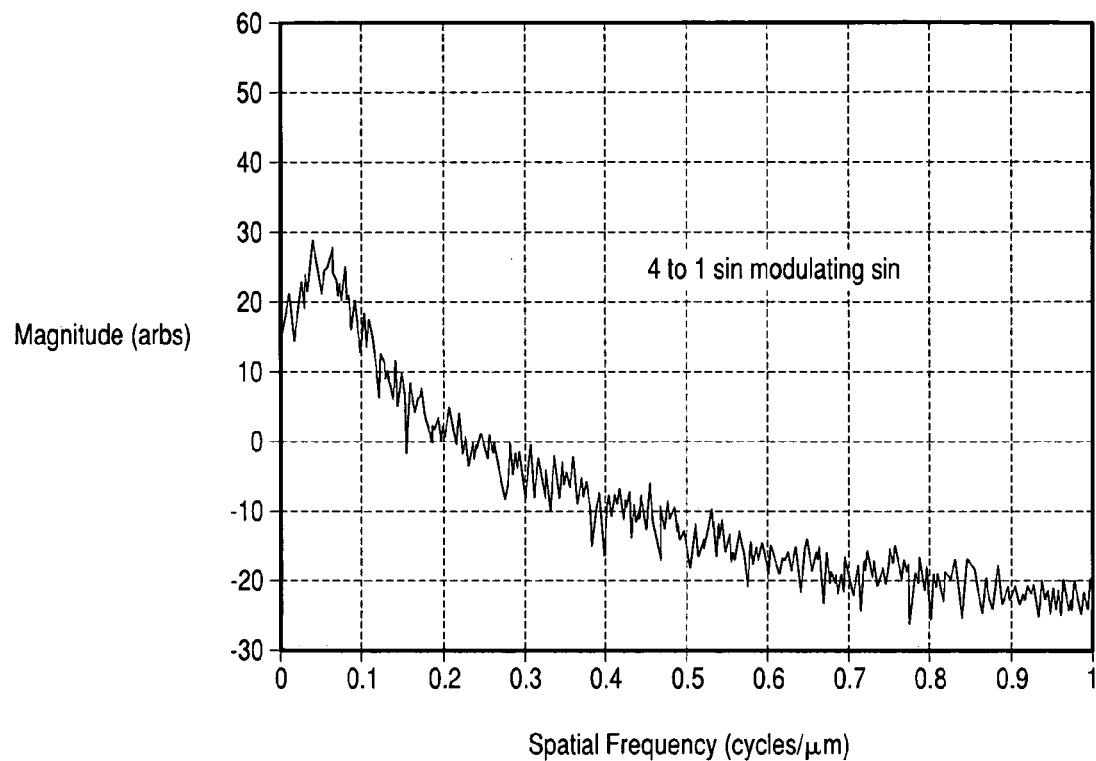
FIG. 10 is a graphical representation of the magnitude of the power spectral density of the randomized surface of the workpiece as a function of spatial frequency.
Figure 11:
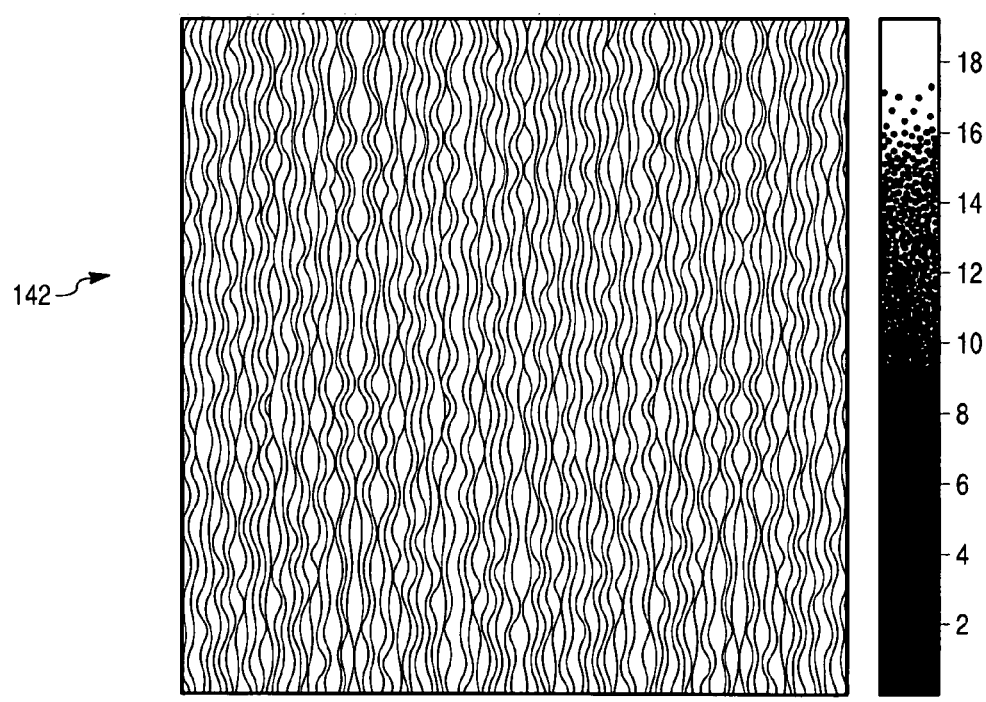
FIG. 11 is a top view of a randomized surface of a workpiece according to an embodiment of the invention.
Figure 12:
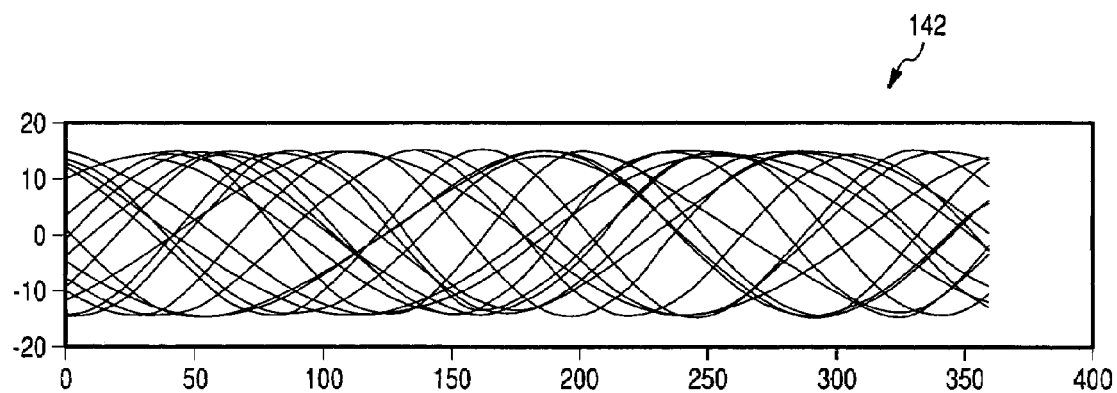
FIG. 12 is a graphical representation of a plurality of paths due to a plurality of cutting passes over the surface of the workpiece.

Referring to FIGS. 8 and 9, the cutting tool 110 may comprise a prismatic structure having a cross section which may include straight facets 130, 132 intersecting at a tip 134 at a peak angle of 2θ. The prismatic shaped cutting tool 110 may also comprise linear segments 130, 132 of the facets 132, 134 resulting in a compound angled prism. The compound angle prism has a first facet 138 at an angle of (α and a second facet 140 at an angle of β with respect to a base 142 of the prism 110. As best understood from FIGS. 8 and 9, the cutting tool 110 may have a cross section with a rounded peak 134 or radius "r." In general the cutting tool can have a cross section of any manufacturable shape.

Figure 13:
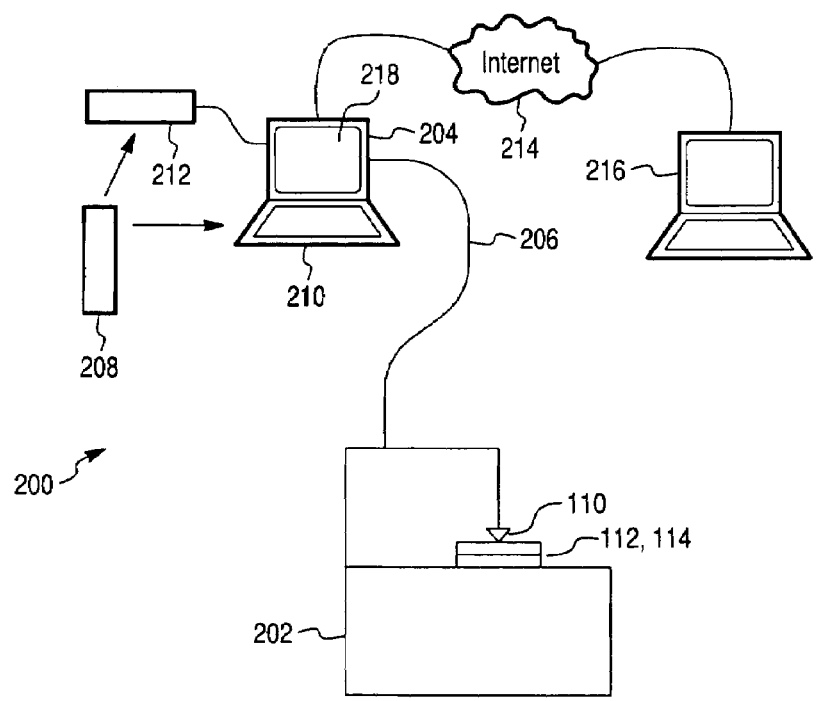
FIG. 13 is a schematic representation of a system and apparatus for machining the surface of a work piece in communication over a communications or data network with remote locations.

An example of the equipment used to machine the surface of the workpiece 112, 114 in the invention is shown in FIG. 13. Machining the surface of the workpiece 112, 114 can be accomplished by computer numerically controlled (CNC) milling or cutting machine 202. The machine 202 includes cutting tool 110, which is controlled by a software program 208 installed in a computer 204. The software program 208 controls the movement of the cutting tool 110. The computer 204 is interconnected to the CNC milling machine 202 by an appropriate cabling system 206. The computer 204 includes storage medium 212 for storing software program 208, a processor for executing the program 208, keyboard 210 for providing manual input to the processor, a display 218 and a modem or network card for communicating with a remote computer 216 via the Internet 214 or a local network.

Figure 15:
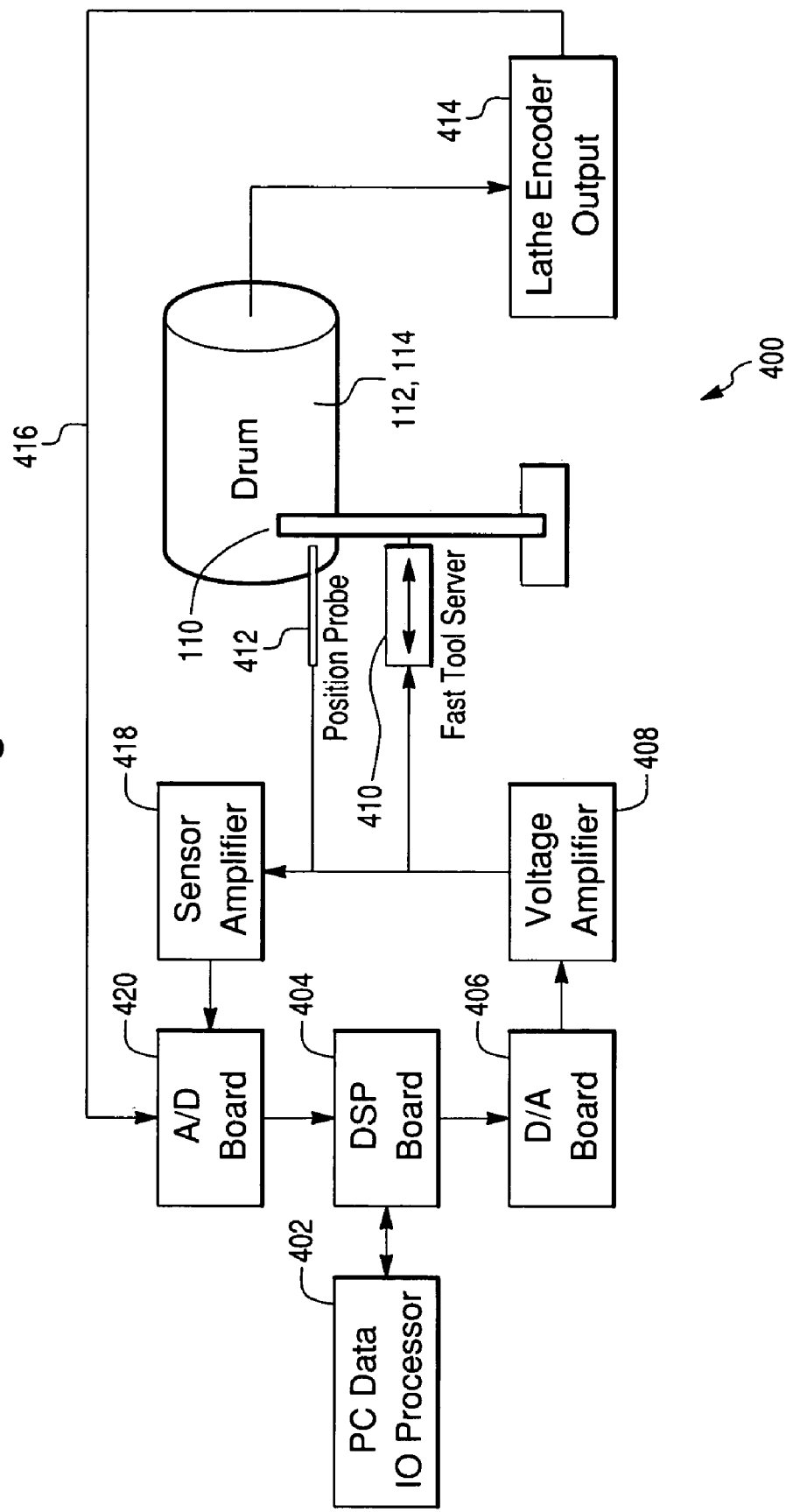
FIG. 15 is a schematic diagram of a master machining system with a fast tool servo for cutting grooves having lateral variations in the surface of a workpiece.

FIG. 15 illustrates a master machining system 400 with a fast tool servo for cutting workpiece grooves with lateral variations. An input/output data processor 402 provides cutting commands to a digital signal processing (DSP) unit 404 that supplies a signal to a digital-to-analog (DA) conversion device 406. Voltage amplifier 408 receives a signal from the DA converter 406 and drives fast tool servo mechanism 410 to direct the motion of cutting tool 110. Cutting tool position probe 412 senses a position of the cutting tool 110 and provides a signal indicative of the position to a sensor amplifier 418. Amplifier 418 amplifies the signal. The amplified signal is directed to analog-to-digital (A/D) converter 420. Lathe encoder 414 determines the position of the workpiece (e.g., drum 112) and provides a feedback signal to the A/D converter 420. The A/D converter thus provides a feedback signal indicative of the position of the cutting tool 110 and the position of the workpiece 112, 114 as output to the digital signal processing unit 404. The DSP unit 404 provides a processed signal to the input/output processor 402.

The system 400 can provide a randomly or pseudo randomly machined workpiece surface. In operation, computer 204 with installed software program 208 is in communication with the CNC milling machine 202. An operator may provide input value $A_i$ to personal computer 204. The operator input can be provided manually by typing the $A_i$ value using keyboard 210. Controlling mathematical function or functions may be stored within the computer's memory or may be stored on a remote computer 216 and accessed via the Internet 214 or via a local network.

In operation, the $A_i$ value is provided to the CNC machine 202. Then cutting element 110 of the CNC machine 202 begins to mill the workpiece 112, 114 according to commands provided by the software program 208 that provides coordinates to direct movement of the cutting tool 110. Additionally, the program 208 controls depth of the milling process. The process provides a nonrandomized, randomized or pseudo randomized workpiece that can be used as a "positive" or a "negative" master to produce an optical substrate. For example, the optical substrate 24 of FIG. 1 can be generated by forming a negative or positive electroform over the surface of the workpiece 112, 114. Alternatively, a molding material can be used to form a replica of an original positive or negative master—for example, an ultraviolet (UV) or thermal curing epoxy material or silicon material. Any of these replicas may be used as a mold for a plastic part. Embossing, injection molding, or other methods may be used to form the parts.

Autocorrelation function, R(x,y), is a measure of the randomness of a surface in electro metrology. Over a certain correlation length, $l_c$, however, the value of an autocorrelation function, R(x,y), drops to a fraction of its initial value. An autocorrelation value of 1.0, for instance, would be considered a highly or perfectly correlated surface. The correlation length, $l_c$, is the length at which the value of the autocorrelation function is a certain fraction of its initial value. Typically, the correlation length is based upon a value of 1/e, or about 37 percent of the initial value of the autocorrelation function. A larger correlation length means that the surface is less random than a surface with a smaller correlation length.

In some embodiments of the invention, the autocorrelation function value for the three-dimensional surface of the optical substrate 24 drops to less than or equal to 1/e of its initial value in a correlation length of about 1 cm or less. In still other embodiments, the value of the autocorrelation function drops to 1/e of its initial value in about 0.5 cm or less. For other embodiments of the substrate the value of the autocorrelation function along length l drops to less than or equal to 1/e of its initial value in about 200 microns or less. For still other embodiments, the value of the autocorrelation function along width w drops to less than or equal to 1/e of its initial value in about 11 microns or less.

According to an embodiment of this invention, randomization of structures is accomplished with phase modulation only. For example, using randomization of the phase of a sine wave, or other periodic function, a modulated path can be achieved by applying a randomization algorithm to succeeding adjacent paths of the structures. A random number, such as a binary random number having only two possible values, is computer generated between each path. The number is then compared to a threshold. If the number is greater that the threshold then the phase of the next path is advanced by a constant, if the number is less than or equal to the constant, then the phase of the next path is delayed by a constant. As an example, the threshold could be 0.5 and the random number could be a binary number with possible values +1 and −1. The number of times that phase is changed by the randomization algorithm is at least once, and may be more than once. The present invention is not limited to a particulare selected constant for changing the phase. The selected constant may be 120° or 90°, for example. With each next pass, the next phase is advanced or delayed by 120° (or 90°) according to whether the random number exceeds or is less than the constant. Of course different constants may be used, or a range of values within certain intervals, either symmetrical or unsymmetrical, can be used as threshold values. As an example of assymetrical constants, the constant may be +120° and −90°, for example.

The phase only limited modulation approach creates a highly randomized surface that has less overhead in depth.

Figure 17:
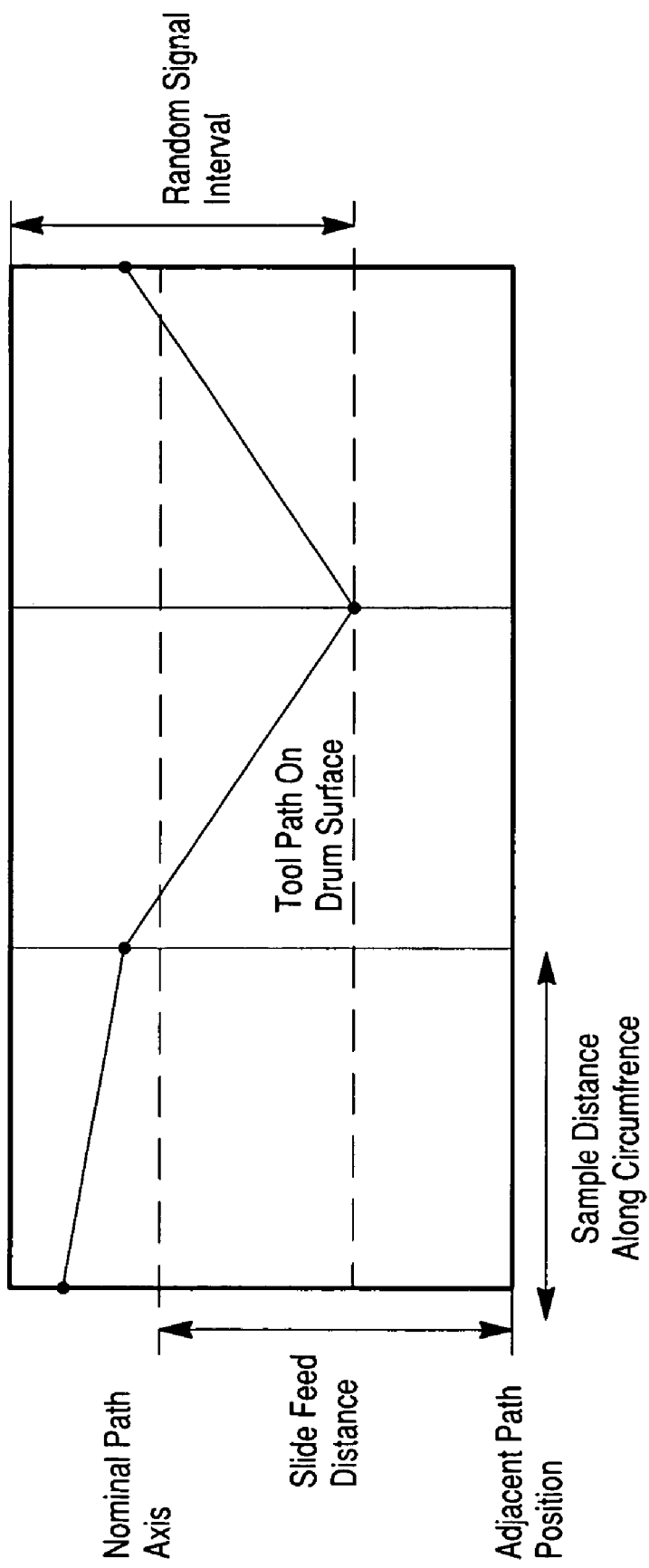
FIG. 17 and FIG. 18 are graphs of slide feed distance to circumference distance.

FIG. 17 is an illustration of an embodiment according to equation 5. Here "slide feed distance" is $S_i-S_{i-1}$ and "Random signal interval" is the amplitude of $A_i$ $r_i(\phi)$. In this embodiment, $y_i$ may be a digital signal that is sampled along the drum circumference.

Figure 18:
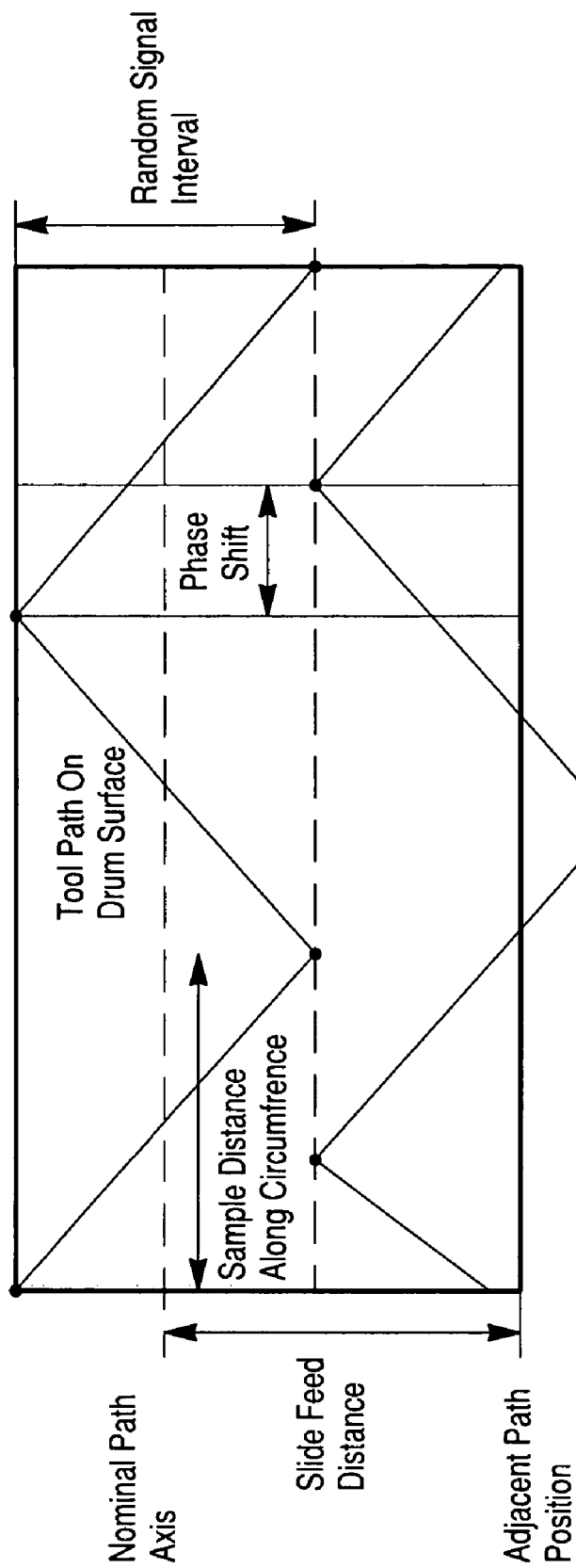

FIG. 18 is an illustration of the embodiment according to equations 1 to 3 but illustrated with a sawtooth wave for simplicity instead of a sine.

Figure 19:
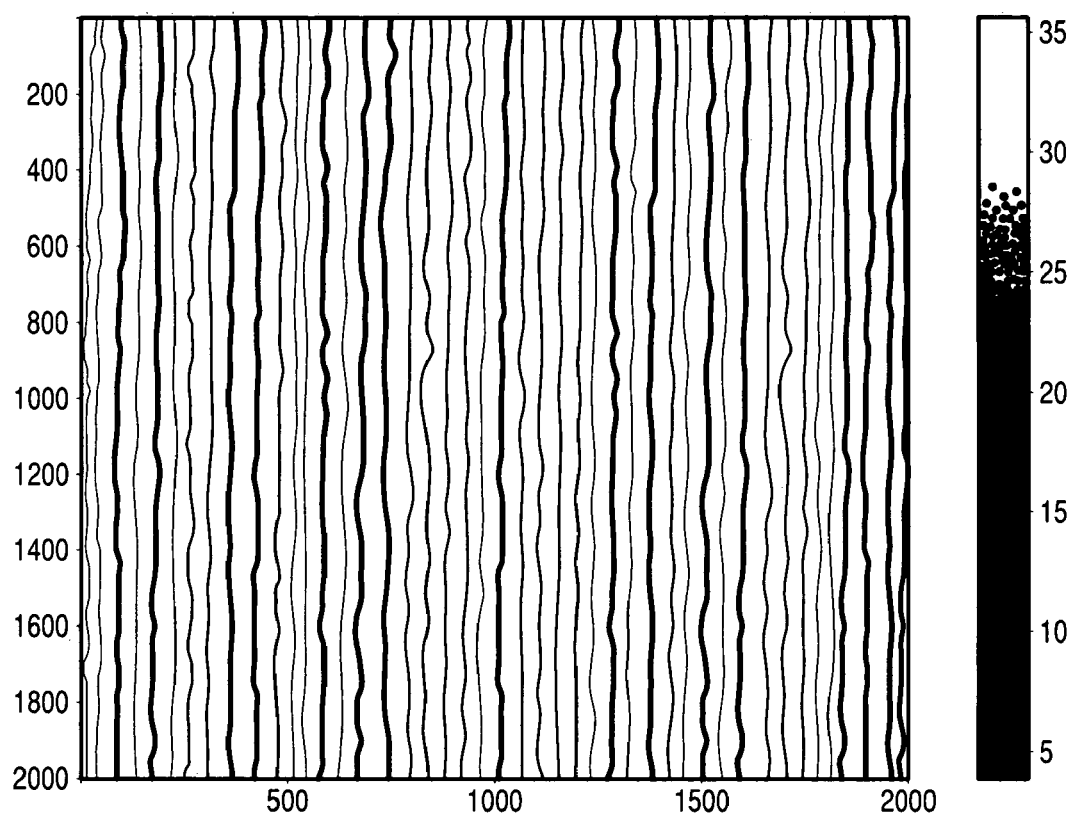
FIG. 19 is a surface height map.

FIG. 19 is a replicate surface height map of a two wavelength phase shifting design occurring according to equation 4a to 4c. The surface shown is a negative copy of the drum surface. Here $S_i-S_{i-1}$=45 um, n=2, $A_1+A_2$=22.5 um, $\lambda_1$=170 um, $\lambda_2$=20 mm, $\delta_1$=0, $\Delta_1$=π/3 radians, $\delta_2$=0, $\Delta_2$=π/3 radians and the prism peak angle is 90 degrees.

Figure 20:
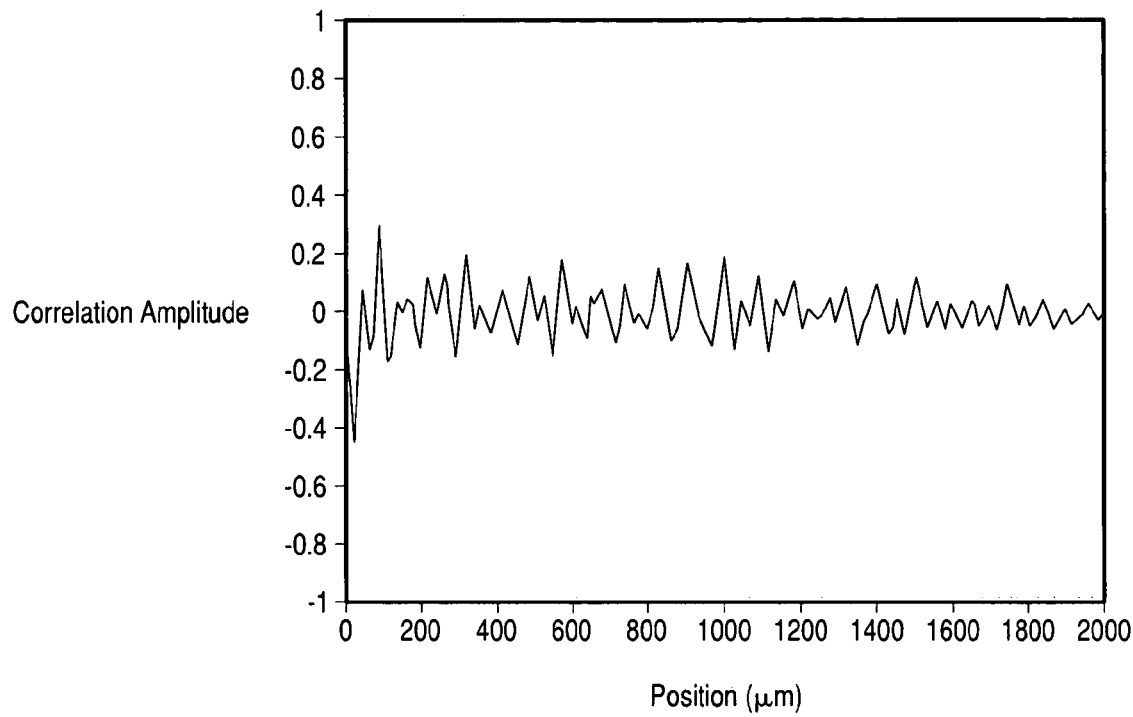
FIG. 20 is an autocorrelation of the FIG. 19 surface.

FIG. 20 is an autocorrelation of the surface in FIG. 19 for a profile of the surface in a direction perpendicular to the circumferential direction. Note the autocorrelation length is less than 200 um.

Figure 21:
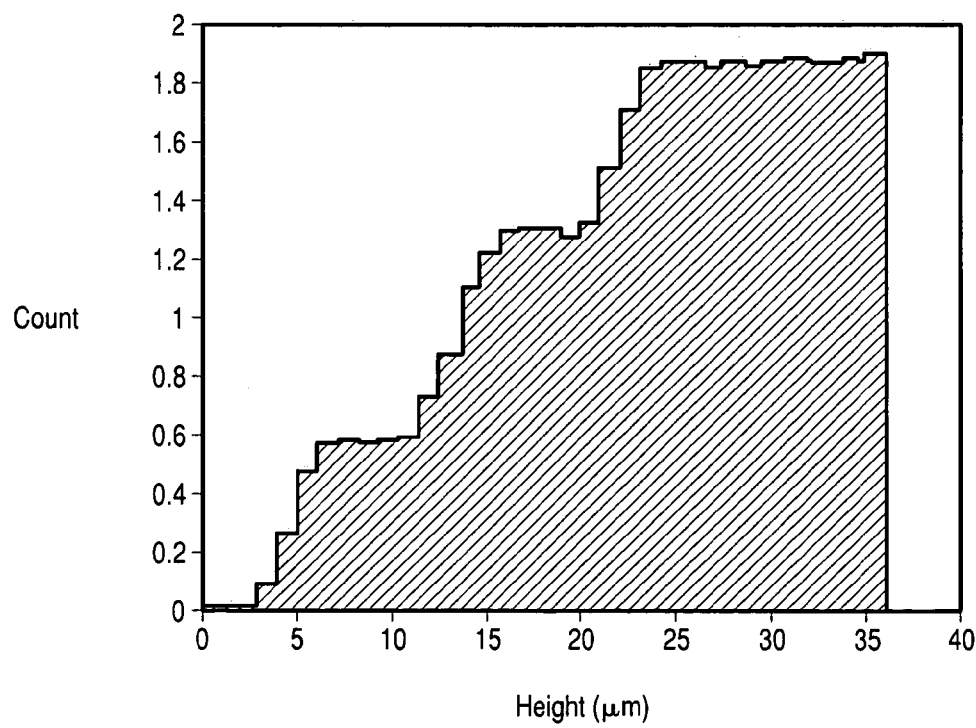
FIG. 21 is a surface height (depth) histogram.

FIG. 21 is the surface height (depth) histogram for the surface shown is FIG. 19. Note that total depth of the surface is 33 um. Here, using previous randomization algorithms would result in a peak to valley height of 45 um. If for example the desired peak to valley modulation is 45 um (in plane) then the modulation approach can be decomposed to a first component that is phase limited and a second component that is not. The height to pitch advantage of the invention will be partially reduced depending on the ratio of the two components and the phase limiting parameter(s).

The height to pitch ratio will depend on the range of the phase steps allowed. A small phase step (5 degrees) will provide less randomization and a large phase step (170 degrees) will provide a deeper structure. +/−50–140 degrees is the preferred range.

While preferred embodiments of the invention have been described, the present invention is capable of variation and modification and therefore should not be limited to the precise details of the Examples. The invention includes changes and alterations that fall within the purview of the following claims.

The invention claimed is:

1. An optical substrate comprising:
   at least one surface, said at least one surface comprising at least one optical structure having a shape and dimensions, wherein the shape and dimensions of each optical structure represents in part a modulation of a corresponding idealized structure, and wherein said shape and dimensions of each of said at least one optical structure is determined in part by at least one randomly generated component of modulation wherein the modulation of each of said at least one optical structure is limited by a neighboring optical structure comprised by the surface.

2. An optical substrate according to claim 1 wherein said at least one optical structure represents an idealized prismatic structure following a surface path modulated by a mathematical function (1)

$$y_i = A_i \sin\{\phi\lambda - \Phi_i\} + S_i \tag{1}$$

defined relative to a segment C of a coordinate system, wherein i is an integer indicative of the $i^{th}$ surface path, $y_i$ is an instantaneous displacement of the path relative to C on the $i^{th}$ path, $A_i$ is an amplitude scaling factor of the $i^{th}$ path relative to C, $S_i$ is a shift in a starting position of $y_i$, $\phi$ is a number between zero and 2π inclusive, λ is a wavelength which is a real number, $\Phi_i$ is a phase component for the $i^{th}$ path, wherein $$\Phi_i = \Phi_{i-1} + Q_i\Delta + R_i\delta \tag{2}$$

where $Q_i$ is a randomly or pseudo randomly chosen number having a value of 1 or −1, $R_i$ is a continuous random variable between −1 and 1, each defined for the $i^{th}$ path, and Δ and δ are real numbers that define a magnitude of a phase stepping component and a magnitude of a phase dither component, respectively.

3. An optical substrate according to claim 1 wherein said at least one optical structure represents an idealized prismatic structure following a surface path modulated by a mathematical function (3a)

$$y_i = \sum_{k=1}^{n} A_{i,k} \sin\{\phi \lambda_k - \Phi_{i,k}\} + S_i \tag{3a}$$

defined relative to a segment C of a coordinate system, wherein i is an integer indicative of the $i^{th}$ surface path, $y_i$ is an instantaneous displacement of the path relative to C on the $i^{th}$ path, $A_{i,k}$ is the $k^{th}$ amplitude scaling factor of the $i^{th}$ path relative to C, $S_i$ is a shift in a starting position of $y_i$, $\phi$ is a number between zero and $2\pi$ inclusive, n is an integer greater than 1, each wavelength $\gamma_k$ is a real number, $\Phi_{i,k}$ is the $k^{th}$ phase component of the $i^{th}$ path, wherein $$\Phi_{i,k} = \Phi_{i-1,k} + Q_{i,k}\Delta + R_{i,k}\delta \tag{3b}$$

$Q_{i,k}$ is the $k^{th}$ randomly or pseudo randomly chosen number having a value of 1 or −1 for the $i^{th}$ path, $R_{i,k}$ is the $k^{th}$ continuous random variable having a value between −1 and 1 for the $i^{th}$ path, and Δ and δ are real numbers that define a magnitude of a phase stepping component and a magnitude of a phase dither component, respectively.

4. An optical substrate according to claim 1 wherein said at least one optical structure represents an idealized prismatic structure following a surface path modulated by a mathematical function (4a)

$$y_i = \sum_{k=1}^{n} A_{i,k} f\{\phi \lambda_k - \Phi_{i,k}\} + S_i \tag{4a}$$

wherein $f$ is a periodic function defined relative to a segment C of a coordinate system, wherein i is an integer indicative of the $i^{th}$ surface path, $y_i$ is an instantaneous displacement of the path relative to C on the $i^{th}$ path, $A_{i,k}$ is the $k^{th}$ amplitude scaling factor of the $i^{th}$ path relative to C, $S_i$ is a shift in a starting position of $y_i$, $\phi$ is a number between zero and $2\pi$ inclusive, n is an integer greater than 1, each wavelength $\lambda_k$ is a real number, $\Phi_{i,k}$ is the $k^{th}$ phase component of the $i^{th}$ path, wherein $$\Phi_{i,k} = \Phi_{i-1,k} + Q_{i,k}\Delta + R_{i,k}\delta \tag{4b}$$

$Q_{i,k}$ is the $k^{th}$ randomly or pseudo randomly chosen number having a value of 1 or −1 for the $i^{th}$ path $R_{i,k}$ is the $k^{th}$ continuous random variable having a value between −1 and 1 for the $i^{th}$ path, and Δ and δ are real numbers that define a magnitude of a phase stepping component and a magnitude of a phase dither component, respectively.

5. The substrate of claim 3 where $0 \leq \Delta < (0.95\pi)$ radians.

6. The substrate of claim 3 where $0 \leq \delta < (0.5\pi)$ radians.

7. The substrate of claim 3 where $0 \leq \Delta < (0.95\pi)$ radians and $0 \leq \delta < (0.5\pi)$ radians.

8. An optical substrate according to claim 1 wherein said at least one optical structure represents an idealized prismatic structure following a surface path modulated by a mathematical function $$y_i = A_i[(1-m)r_i(\phi) + m\, r_{i-1}(\phi)] + S_i$$

wherein i and i−1 are indicative of an $i^{th}$ and a $(i-1)^{th}$ path, respectively, the $i^{th}$ and the $(i-1)^{th}$ paths being adjacent paths, the $i^{th}$ and the $(i-1)^{th}$ path amplitudes being mixed, wherein part of a random vector for $y_{i-1}$ is added to $y_i$ for the $i^{th}$ path, wherein $r_i(\phi)$ is a band-limited random or pseudo random function of $\phi$ for each $i^{th}$ path, $r_i(\phi)$ has a continuously varying value between −1 and 1;

$\phi$ is 0 to $2\pi$ inclusive;

m is a scalar mixing parameter with a value between 0 and 1;

$A_i$ is an amplitude scaling parameter; and $S_i$ is a shift in a starting position of $y_i$.

9. The optical substrate of claim 1, wherein the optical substrate comprises an optically transparent film having a second surface opposite to the first surface, the second surface being smooth.

10. The optical substrate of claim 2, wherein the optical substrate comprises an optically transparent film having a second surface opposite to the first surface, the second surface being smooth.

11. The optical substrate of claim 3, wherein the optical substrate comprises an optically transparent film having a second surface opposite to the first surface, the second surface being smooth.

12. The optical substrate of claim 4, wherein the flinctionfis selected from the group of mathematical functions consisting of triangular function, sawtooth function and square wave function.

13. A backlight display device comprising:
   a light source for generating light;
   a light guide for guiding the light therealong including a reflective surface for reflecting the light out of the light guide; and
   an optical film comprising:
      at least one surface, said at least one surface comprising at least one optical structure having a shape and dimensions, wherein the shape and dimensions of each optical structure represents in part a modulation of a corresponding idealized structure, and wherein said shape and dimensions of each of said at least one optical structure is determined in part by at least one randomly generated component of modulation wherein the modulation of each of said at least one optical structure is limited by a neighboring optical structure comprised by the surface.

14. The backlight display device of in claim 13 wherein said at least one optical structure represents an idealized prismatic structure following a surface path modulated by a mathematical function (1)

$$y_i = A_i \sin\{\phi\lambda - \Phi_i\} + S_i \tag{1}$$

defined relative to a segment C of a coordinate system, wherein i is an integer indicative of the $i^{th}$ surface path, $y_i$ is an instantaneous displacement of the path relative to C on the $i^{th}$ path, $A_i$ is an amplitude scaling factor of the $i^{th}$ path relative to C, $S_i$ is a shift in a starting position of $y_i$, $\phi$ is a number between zero and $2\pi$ inclusive, $\lambda$ is a wavelength which is a real number, $\Phi_i$ is a phase component for the $i^{th}$ path, wherein $$\Phi_i = \Phi_{i-1} + Q_i\Delta + R_i\delta \tag{2}$$

where $Q_i$ is a randomly or pseudo randomly chosen number having a value of 1 or −1 $R_i$ is a continuous random variable between −1 and 1, each defined for the $i^{th}$ path, and Δ and δ are real numbers that define a magnitude of a phase stepping component and a magnitude of a phase dither component, respectively.

15. The backlight display device of claim 13 wherein said at least one optical structure represents an idealized prismatic structure following a surface path modulated by a mathematical function (3a)

$$y_i = \sum_{k=1}^{n} A_{i,k} \sin\{\phi \lambda_k - \Phi_{i,k}\} + S_i \qquad (3a)$$

defined relative to a segment C of a coordinate system, wherein i is an integer indicative of the $i^{th}$ surface path, $y_i$ is an instantaneous displacement of the path relative to C on the $i^{th}$ path, $A_{i,k}$ is the $k^{th}$ amplitude scaling factor of the $i^{th}$ path relative to C, $S_i$ is a shift in a starting position of $y_i$, $\phi$ is a number between zero and $2\pi$ inclusive, n is an integer greater than 1, each wavelength $\lambda_k$ is a real number, $\Phi_{i,k}$ is the $k^{th}$ phase component of the $i^{th}$ path, wherein $$\Phi_{i,k} = \Phi_{i-i,k} + Q_{i,k}\Delta + R_{i,k}\delta \qquad (3b)$$

$Q_{i,k}$ is the $k^{th}$ randomly or pseudo randomly chosen number having a value of 1 or –1 for the $i^{th}$ path, $R_{i,k}$ is the $k^{th}$ continuous random variable a value between –1 and 1 for the $i^{th}$ path, and $\Delta$ and $\delta$ are real numbers that define a magnitude of a phase stepping component and a magnitude of a phase dither component, respectively.

16. The backlight display device of claim 13 wherein said at least one optical structure represents an idealized prismatic structure following a surface path modulated by a mathematical function $$y_i = A_i[(1-m)r_i(\phi) + m\, r_{i-1}(\phi)] + S_i$$

wherein i and i–1 are indicative of an $i^{th}$ and a(i–1)$^{th}$ path, respectively, the $i^{th}$ and the (i–1)$^{th}$ paths being adjacent paths, the $i^{th}$ and the (i–1)$^{th}$ path amplitudes being mixed, wherein part of a random vector for $y_{i-1}$ is added to $y_i$ for the $i^{th}$ path, wherein $r_i(\phi)$ is a band-limited random or pseudo random function of $\phi$ for each $i^{th}$ path, $r_i(\phi)$ has a continuously varying value between –1 and 1;

$\phi$ is 0 to $2\pi$ inclusive;

m is a scalar mixing parameter with a value between 0 and 1;

$A_i$ is an amplitude scaling parameter; and $S_i$ is a shift in a starting position of $y_i$.

17. The backlight display device of claim 15 wherein $S_i - S_{i-1}$ is in the range of 5 μm to 200 μm.

18. The backlight display device of claim 15 wherein the prismatic structure has an apex angle of between 20 degrees and 160 degrees.

19. An optical substrate according to claim 1 wherein said at least one optical structure represents an idealized prismatic structure.

20. An optical substrate according to claim 1 wherein said at least one optical structure represents an idealized structure characterized by a function, wherein a phase of the function is randomly or pseudo randomly modulated.

* * * * *